(12) United States Patent
Wong et al.

(10) Patent No.: US 9,297,104 B2
(45) Date of Patent: Mar. 29, 2016

(54) WASHING MACHINE SUSPENSION BALL SUPPORT

(71) Applicant: ILLINOIS TOOL WORKS INC., Glenview, IL (US)

(72) Inventors: Chong B. Wong, Vernon Hills, IL (US); Michael W. Davis, Elburn, IL (US)

(73) Assignee: Illinois Tool Works Inc., Glenview, IL (US)

( * ) Notice: Subject to any disclaimer, the term of this patent is extended or adjusted under 35 U.S.C. 154(b) by 4 days.

(21) Appl. No.: 14/373,056

(22) PCT Filed: Jan. 24, 2013

(86) PCT No.: PCT/US2013/022849
§ 371 (c)(1),
(2) Date: Jul. 18, 2014

(87) PCT Pub. No.: WO2013/112658
PCT Pub. Date: Aug. 1, 2013

(65) Prior Publication Data
US 2014/0367536 A1    Dec. 18, 2014

Related U.S. Application Data

(60) Provisional application No. 61/590,576, filed on Jan. 25, 2012.

(51) Int. Cl.
*D06F 37/24* (2006.01)
*D06F 37/26* (2006.01)
*D06F 37/20* (2006.01)
(Continued)

(52) U.S. Cl.
CPC ............... *D06F 37/24* (2013.01); *D06F 37/20* (2013.01); *D06F 37/22* (2013.01); *D06F 37/262* (2013.01); *D06F 37/263* (2013.01);
(Continued)

(58) Field of Classification Search
CPC ..... D06F 37/24; D06F 37/262; D06F 37/263; D06F 37/264; D06F 37/265; D06F 37/20; D06F 37/268; D06F 37/269; F16F 15/067
USPC .................... 248/613; 68/23.3, 23.1; 312/228
See application file for complete search history.

(56) References Cited

U.S. PATENT DOCUMENTS 5,083,845 A * 1/1992 Sparks .................. D06F 39/001
206/320
5,117,659 A * 6/1992 Sharp ...................... D06F 37/24
248/568

(Continued)

FOREIGN PATENT DOCUMENTS

BR WO 2009036540 A1 * 3/2009 .............. D06F 37/24
BR WO 2009065198 A1 * 5/2009 .............. D06F 37/24
(Continued)

OTHER PUBLICATIONS

ISR and WO for PCT/US2013/022849 mailed May 6, 2013.

*Primary Examiner* — Terrell McKinnon
*Assistant Examiner* — Eret McNichols

(57) ABSTRACT

A ball support for a suspension rod in top loading washing machines includes a main body, a support segment and a hook capture head for securing the hooked end of the rod between spaced bars of the cylindrical rod support. Attaching and detaching the ball support from the rod requires inversion of the parts relative to one another.

16 Claims, 4 Drawing Sheets

(51) Int. Cl.
*F16F 15/067* (2006.01)
*D06F 37/22* (2006.01)

(52) U.S. Cl.
CPC ........... *D06F 37/264* (2013.01); *D06F 37/265* (2013.01); *F16F 15/067* (2013.01)

(56) References Cited

U.S. PATENT DOCUMENTS

| | | | | |
|---|---|---|---|---|
| 5,606,879 A | * | 3/1997 | Froelicher | D06F 37/20 188/129 |
| 5,884,891 A | * | 3/1999 | Hawkins | D06F 37/24 248/288.31 |
| 5,946,946 A | * | 9/1999 | Sharp | D06F 37/20 188/129 |
| 6,009,730 A | * | 1/2000 | Lee | D06F 37/20 68/23.1 |
| 6,089,053 A | * | 7/2000 | Colombera | D06F 37/20 210/144 |
| 6,397,643 B1 | * | 6/2002 | Chang | D06F 37/24 68/23.3 |
| 6,474,113 B1 | * | 11/2002 | Park | D06F 37/24 68/23.3 |
| 2002/0042957 A1 | | 4/2002 | Kim et al. | |
| 2009/0031762 A1 | * | 2/2009 | Kim | D06F 37/20 68/23.3 |
| 2010/0294006 A1 | * | 11/2010 | Tebaldi | D06F 37/268 68/212 |
| 2011/0148260 A1 | | 6/2011 | Silva | |
| 2011/0247372 A1 | * | 10/2011 | Miller | D06F 37/12 68/13 R |
| 2015/0020549 A1 | * | 1/2015 | Yu | D06F 37/265 68/23.2 |
| 2015/0191860 A1 | * | 7/2015 | Sim | D06F 37/265 68/23.3 |

FOREIGN PATENT DOCUMENTS

| | | | | |
|---|---|---|---|---|
| CA | 2513229 A1 | * | 3/2006 | ............. D06F 37/20 |
| CN | WO 2012119370 A1 | * | 9/2012 | ............. D06F 23/04 |
| EP | 0263741 A1 | | 4/1988 | |
| EP | 1589142 A2 | * | 10/2005 | ............. D06F 37/20 |
| JP | WO 2015045244 A1 | * | 4/2015 | ............. D06F 23/04 |
| KR | WO 2013125898 A1 | * | 8/2013 | ............. D06F 37/20 |
| KR | WO 2015012560 A1 | * | 1/2015 | ............. D06F 37/265 |
| KR | 20150054163 A | * | 5/2015 | ............. D06F 37/24 |

* cited by examiner

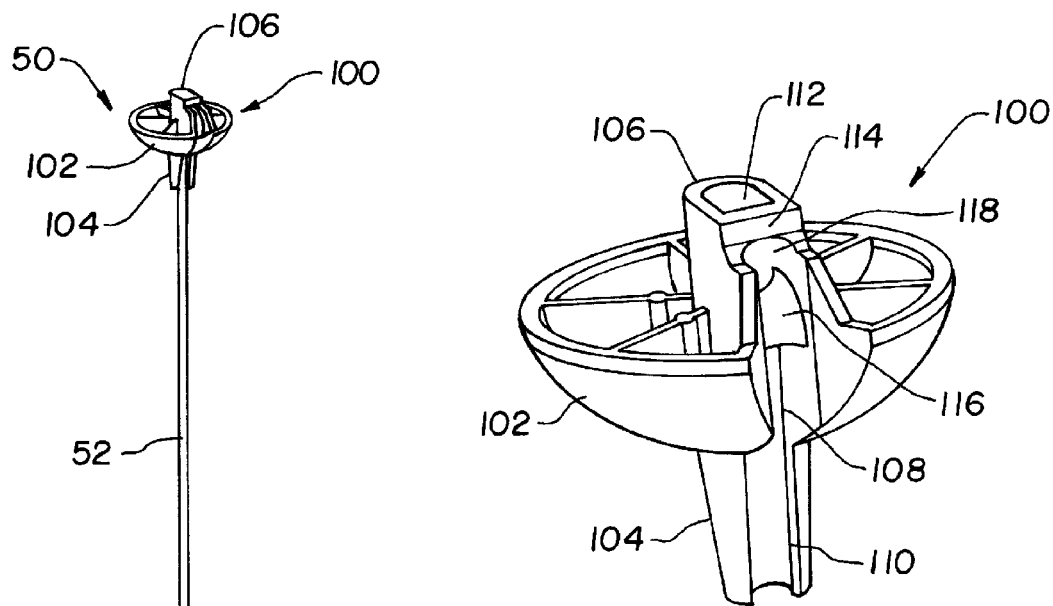
Fig. 2
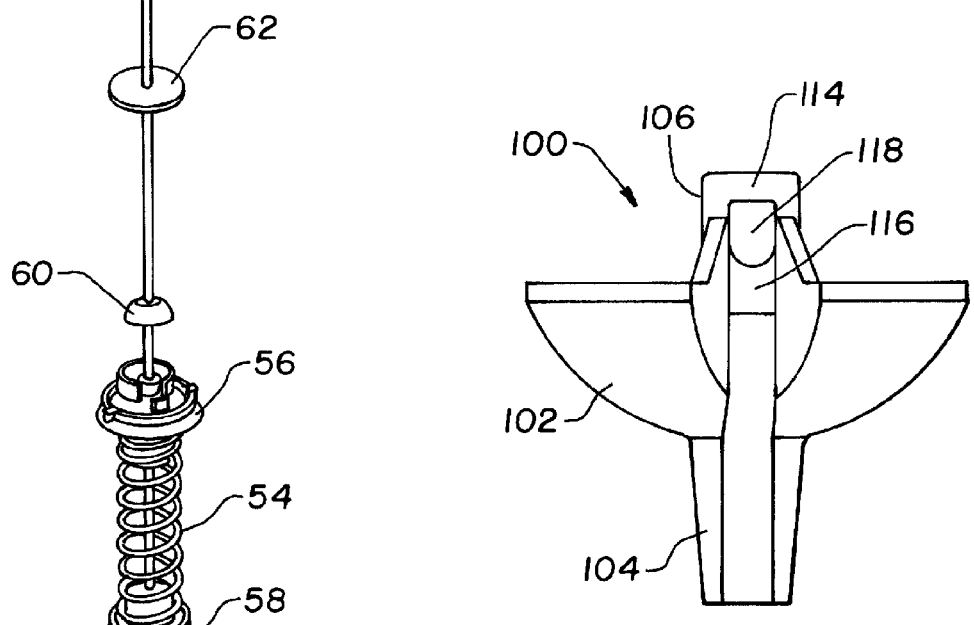
Fig. 1
Fig. 3

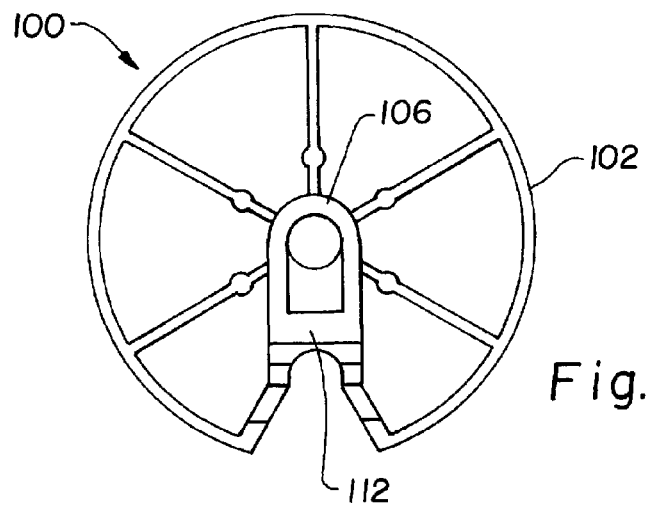
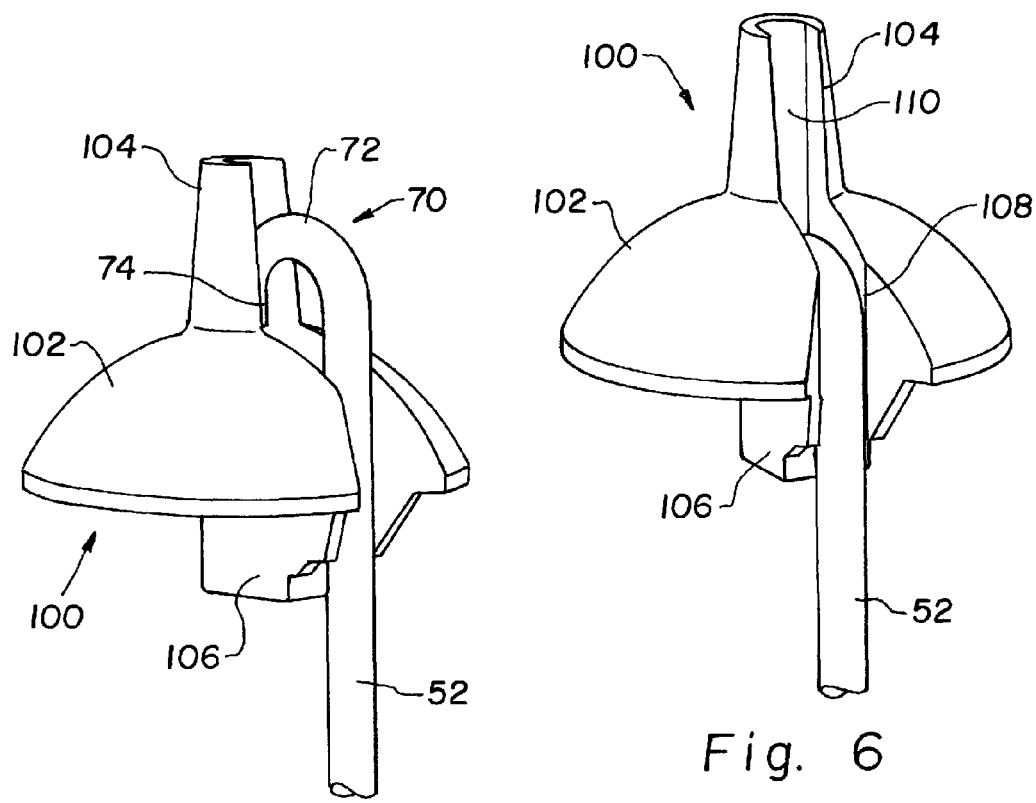

WASHING MACHINE SUSPENSION BALL SUPPORT

CROSS-REFERENCE TO RELATED APPLICATIONS

The present application is a National Phase of PCT/US2013/022849 filed Jan. 24, 2013 claims the benefits of U.S. Provisional Application Ser. No. 61/590,576, filed Jan. 25, 2012.

FIELD OF THE INVENTION

The present invention relates generally to washing machines, and, more particularly, to the suspension systems supporting and controlling movement of the washer drum or tub in a top loading washing machine.

BACKGROUND OF THE INVENTION

A top loading washing machine includes a suspension system to hold the washer drum or tub within the appliance frame, and to control movement of the washer drum or tub. In simple form, the suspension system connects the tub to the frame via springs that control and moderate the movement of the tub as the washing machine operates through various cycles and the load of water and garments or other items in the tub shifts. Without control or damping, the load can shift abruptly, due to the agitating and spinning actions of a wash cycle.

A known suspension system includes a metal rod supporting a spring, with opposite ends of the rod attached to the frame and the washer tub. One end of the rod is formed with a hook that connects to a ball suspension support commonly made of synthetic plastic material. In a known installation of this type, four support rods are provided, one at each corner of the washing machine, and each ball support is held in a cup-like depression of a stamped metal frame member near the top of the washing machine. The lower ends of the rods are connected to the lower end of the tub via the springs on the rods.

In a known installation, the ball support has a radial slot extending from the outside of the part to the axis of the part by which the support engages the rod. The slot is continuously open on the outside from one end of the part to the other end of the part. The ball support slot is slid onto the rod axially below the hooked end portion of the rod. The support is then slid axially along the rod toward the hook until the outer region of the ball support engages the hook end of the rod. Since the rods carry the entire weight of the tub, after installation, the weight of the tub helps to hold the rod firmly in the ball suspension support under normal conditions of use. However, handling of the washing machine during shipping, installation or servicing can alter the designed upright orientation of the machine, allowing the rod to slide out of the ball suspension support and become disengaged therefrom, thereby causing a field failure. Other than the hook end of the rod engaging the end of the ball support, the rod is not otherwise secured to the ball support, and nothing in the structure of the rod or the ball support prevents or inhibits the rod and ball support from axial movement relative to one another sufficient to disengage the parts from each other. Disengagement can occur if relative axial movement between the two extends longer then the length of the hook end of the rod. For example, inverting the washer can cause unintended disengagement.

Accordingly, what is needed is a more secure structure for attaching the suspension rod to the ball support, but preferably one which installs easily and quickly without the need for tools or subsequent adjustment during assembly, installation or servicing.

SUMMARY OF THE INVENTION

The washing machine ball suspension disclosed herein provides a suspension rod attachable to a ball suspension support that requires relative rotation of the lengths of the parts, that is relative inversion of the parts with respect to each other, for complete seating or unseating of a hook of the rod in the ball support.

In one aspect of a form of the washing machine ball suspension the ball suspension support is engaged with the rod in a first position and inverted to fully engage the parts, thereby inhibiting unintended disengagement of the parts during manipulation or handling of the appliance.

In another aspect of a form of the washing machine ball suspension the ball suspension support can be used with known suspension arms to more positively engage the parts.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is a perspective view of a suspension system component having a ball support as disclosed herein;

FIG. 2 is a perspective view of a ball support;

FIG. 3 is an elevational view of the ball support;

FIG. 4 is a top view of the ball support;

FIGS. 5 through 8 are sequential illustrations of the relative positions of components during the assembly of a ball support on a suspension rod;

Figure 7:
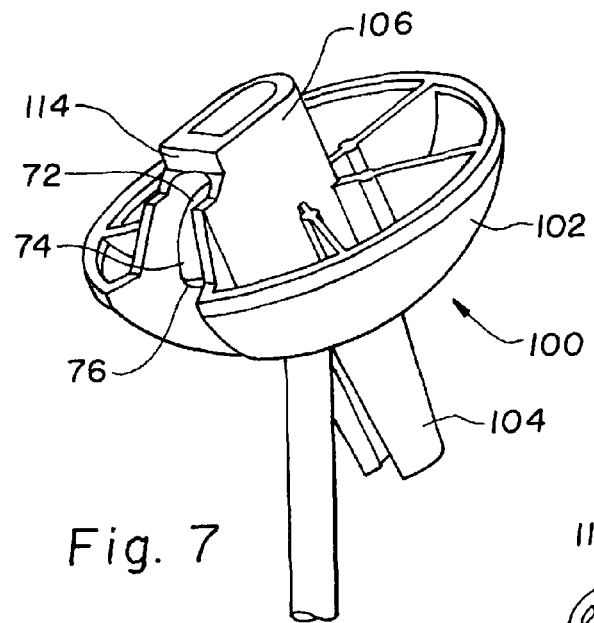

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more particularly to the drawings and to FIG. 1 in particular, there is shown a washing machine tub suspension arm assembly 50 including a suspension rod 52. Suspension arm assembly 50 is configured at a lower end for attachment to a tub of a top loading washing machine, and includes a spring 54 and various spring retainers 56, 58 and spacers or washers 60, 62 disposed on the lower end of suspension rod 52. At the opposite end, which is the upper end when fully installed, suspension rod 52 forms a hook 70 having a curved portion 72 and a return segment 74 leading to an end 76. A ball support 100 as disclosed herein is provided at hook 70 for suspending suspension arm assembly 50 from a frame member of the washing machine. It should be understood that ball support 100 disclosed herein can be used on standard rods 52 using known features for attachment to the tub of a washing machine. Accordingly, rod 52 including hook 70, spring 54 spring retainers 56, 58, spacers or washers 58, 60 and the manner of attaching each relative to one another, as well as the manner for attaching suspension arm assembly 50 to the tub of a top loading washing machine are well known to those skilled in the art and will not be described further herein.

With reference now more particularly to FIGS. 2-4, ball support 100 includes a main body portion 102 generally defining a half sphere having a smoothly curved outer surface. An axially extending cylindrical rod support 104 projects axially from the curved or rounded side of main body portion 102, and a hook capturing head 106 projects axially from the other side of main body portion 102. Cylindrical rod support 104 and hook capturing head 106 are aligned through main body portion 102. An open slot 108 extends into main body portion 102, and is contiguous with an open slot 110 in cylindrical rod support 104 and an open slot 112 in hook capture head 106. Slots 108, 110 and 112 together form a continuous opening from one and of ball support 100 to another and of ball support 100.

Hook capture head 106 includes spaced bars 114, 116 spanning open slot 112 thereof. A space 118 between bars 114, 116 is configured for receiving and capturing hook 70 of suspension rod 52. Slot 112 is open behind bars 114, 116. However, bars 114, 116 inhibit radial movement outwardly of slot 112 and axial movement along slot 112 past either of the bars 114, 116.

Ball support 100 can be made of injection molded plastics of suitable physical characteristics. Rod 52 can be of steel cylindrical rod configuration of known design.

Figure 8:
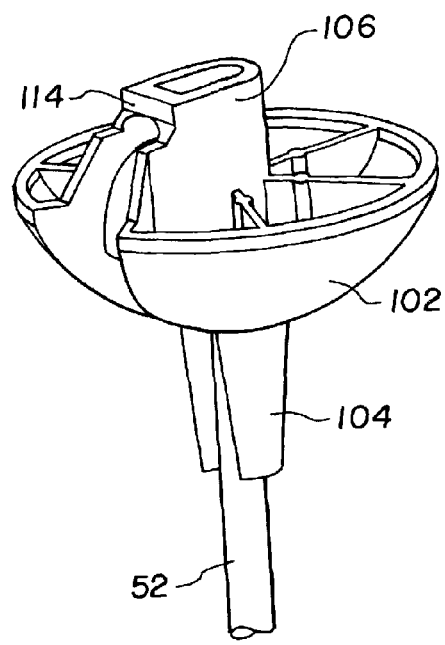
Figure 9:
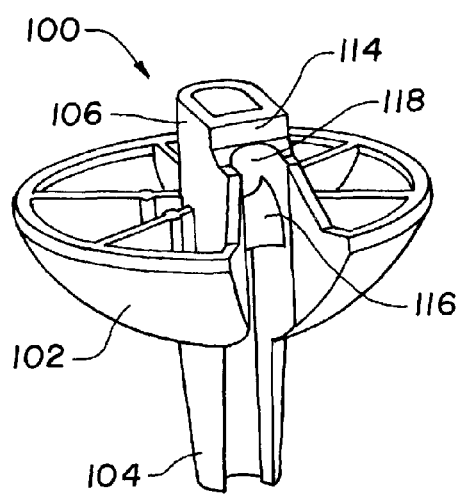
FIG. 9 is a perspective view of another ball support.
Figure 10:
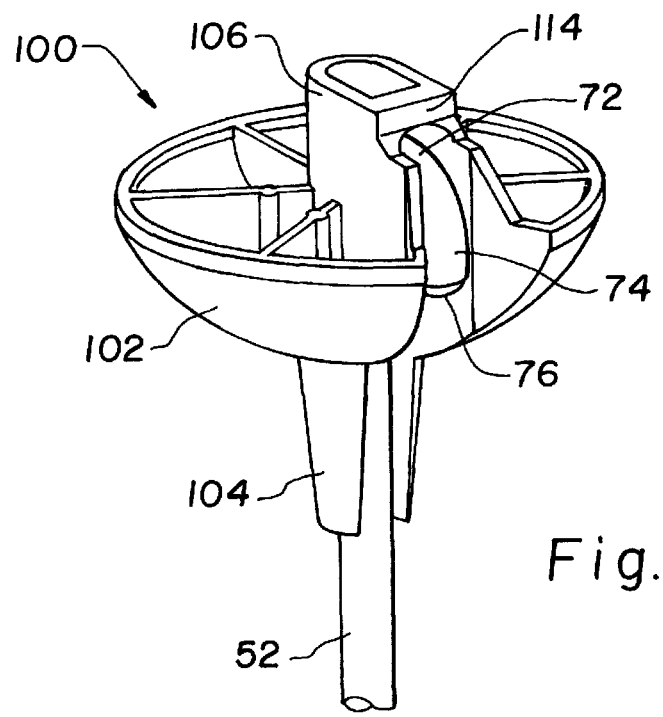
FIG. 10 is a perspective view of an assembled ball support and rod.

During assembly of ball support 100 on suspension rod 52, hook 70 is first inserted into slots 110 and 108 generally from the end of main body portion 102 that includes cylindrical rod support 104. Rod end 76 and return segment 74 are inserted into open slot 110 in cylindrical rod support 104 from the outer end of slot 110. As shown in FIG. 5, during the first step of installation, the orientation of ball support 100 relative to rod 52 is inverted from the final assembled position shown in FIG. 1. Ball support 100 is moved axially toward hook 70 (FIG. 6), and as curved portion 72 encounters and engages bar 116, the rod and ball sport are pivoted relative to one another about a rotational axis defined generally by bar 116 (FIG. 7). The relative rotation continues through a range of movement approximately 180° so that end 76 and return segment 74 rotate through space 118 until a length of rod 52 adjacent hook 70 is seated firmly within cylindrical rod support 104 (FIG. 8). It should be understood that cylindrical rod support 104 can be formed sufficiently narrow to snugly fit and engage suspension rod 52 by interference fit.

FIG. 5 illustrates the manner in which rod 52 is first inserted into ball support 100, and FIG. 6 illustrates hook 70 engaging bar 116 before relative inverting of the parts. FIG. 7 illustrates relative positioning of ball support 100 and suspension rod 52 during pivotal movement from the initial install positions as shown in FIGS. 5 & 6 to the completely installed position, which is shown in FIG. 8. Upon complete installation, a portion of rod 52 inwardly of hook 70 is positioned in slot 112 behind the bar 116, and extends through slot 108 and slot 110. Return segment 74 is positioned on an opposite side of bar 116, generally the outer side thereof. Curved portion 72 projects through space 118 between bars 114, 116.

With hook 70 projecting through space 118 and positioned between bars 114 and 116, rod 52 and ball support 100 cannot become disengaged easily even if axial movement is enabled due to tipping of a washing machine in which it is installed. Even if some relative pivotal movement causes rod 52 to move outwardly from cylindrical rod support 104, when installed in a washing machine the parts can not move relative to one another a distance sufficient to allow disengagement. With bars 114, 116 on opposite sides of hook 70, relative axial movements between ball support 100 and rod 52 are confined. To disengage ball support 100 from rod 52, the ball support must be rotated to the inverted position shown in FIG. 5, which cannot occur with the washer drum installed within the washer frame and housing.

Figure 11:
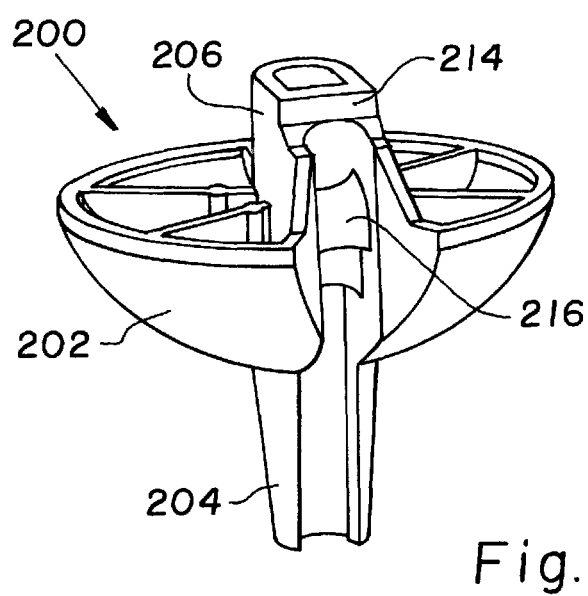
FIG. 11 is a perspective view of yet another ball support.

Bar 116 can be a simple block like structure or can be curved to retain the rounded periphery of rod 52 more smoothly, or can be of different shapes to engage hook 70 more securely and/or to provide strength. FIG. 11 illustrates a ball support 200 having a main body portion 202, a cylindrical rod support 204 and a hook capture head 206 including a bar 214, all substantially similar to the similarly numbered parts with respect to ball support 100 previously described. However, hook capture head 206 further includes a generally T-shaped bar 216 rather than the more solid, block-like bar 116 found in ball support 100.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A ball support for a washing machine suspension arm assembly having a suspension rod with a hook at one end thereof, said ball support comprising:
    a ball support body having a slot configured for receiving a portion of the rod inwardly of the hook; and
    a hook capture head on said body having a capture head slot contiguous with said slot of said body, and including a first bar spanning said capture head slot at an end thereof, and a second bar spaced from said first bar and spanning said capture head slot at a side thereof, and configured for receiving the hook of the rod on opposite sides of said second bar and between the first and second bars.

2. The ball support of claim 1, including a cylindrical rod support aligned with said hook capture head on an opposite side of said body from said hook capture head.

3. The ball support of claim 2, said second bar having a curved surface for receiving said hook.

4. The ball support of claim 2, said cylindrical rod support including a cylindrical rod support slot configured for engaging the rod by interference fit.

5. The ball support of claim 1, said second bar having a curved surface for receiving said hook.

6. The ball support of claim 1, said bars defining an indirect path for receiving the hook by relative rotation of the rod and the ball support with respect to one another.

7. A washing machine suspension arm assembly, comprising:
   a suspension rod with a hook at one end thereof;
   a ball support attached to said suspension rod, said ball support having a continuous slot between a lower end of said support and an upper end of said support;
   said suspension rod disposed in said slot; and
   a hook capture head on said body having first and second bars spanning said slot and spaced from one another, said first bar disposed at an end of said slot, and said second bar disposed along a side of said slot, said hook capture head having portions of the hook of the rod on opposite sides of said second bar and between the first and second bars, and said rod secured against axial movement in either direction within said slot by engagement against said first and second bars.

8. The ball support of claim 7, including a cylindrical rod support aligned with said hook capture head on an opposite side of said ball support from said hook capture head.

9. The ball support of claim 8, said second bar having a curved surface for receiving said hook.

10. The ball support of claim 8, said cylindrical rod support including a cylindrical rod support slot configured for engaging the rod by interference fit.

11. The ball support of claim 7, said second bar having a curved surface for receiving said hook.

12. A ball support for a washing machine suspension arm assembly having a suspension rod with a hook at one end thereof, said ball support comprising:
   a ball support body having a slot configured for receiving a portion of the rod inwardly of the hook;
   a hook capture head on said body having a capture head slot contiguous with said slot of said body; and
   first and second spaced bars spanning said capture head slot, said first bar being disposed at an end of said slot and said second bar being disposed along a side of said slot and defining an indirect path for receiving the hook by inversion of said ball support body relative to the suspension rod while advancing the hook into the hook capture head and between the spaced bars.

13. The ball support of claim 12, including a cylindrical rod support aligned with said hook capture head on an opposite side of said ball support from said hook capture head.

14. The ball support of claim 13, said second bar having a curved surface for receiving said hook.

15. The ball support of claim 13, said cylindrical rod support including a cylindrical rod support slot configured for engaging the rod by interference fit.

16. The ball support of claim 12, said second bar having a curved surface for receiving said hook.

* * * * *